Patented Sept. 29, 1931

1,825,515

UNITED STATES PATENT OFFICE

MAX FORRER, OF PARIS, FRANCE, ASSIGNOR TO ANODE RUBBER COMPANY LIMITED, OF GUERNSEY, ENGLAND

METHOD FOR THE PRODUCTION OF HIGHLY VISCOUS AQUEOUS DISPERSIONS OF RUBBER, GUTTA PERCHA AND BALATA

No Drawing. Application filed June 2, 1928, Serial No. 282,511, and in Germany June 9, 1927.

The rubber industry has recently adopted methods for the direct utilization of rubber latex.

The small viscosity of latex, however, often causes difficulties, because the latex runs down immediately from inclined surfaces and yields after drying only a very thin rubber layer. Hence, it would be desirable to bring the latex into the consistency of a highly viscous lacquer, as in such case rubber coatings could be produced more easily by dipping, painting, spreading, spraying or the like. One single layer of viscous latex would be sufficient to produce a rubber layer of useful thickness.

Though latex concentrated up to a rubber content of 50-70 per cent is somewhat thicker than natural latex having only a rubber content of about 35 per cent, but its viscosity is still practically insufficient. The viscosity of latex changes suddenly without forming a product having a viscosity intermediate between the very low viscosity of a latex of 50 per cent rubber and the pasty consistency of a latex of 75 per cent rubber. This sudden change of consistency lies at the point of inversion of the dispersion that is to say at the point at which the phases of the mixture change their position as disperse and continuous phases.

It has already been proposed to add to latex slight quantities of gelatine in order to increase its viscosity. The effect of such an addition is, however, insufficient, as diluted solutions of gelatine have still a too low viscosity, while solutions of higher concentration solidify to gels.

This invention is based on the fact that by adding to latex completely hydrolyzed proteins its viscosity is highly increased.

Partially hydrolyzed proteins have been already added to latex producing thereby a creaming and a separation into an upper layer of increased rubber content and a nearly rubber-free lower layer, while by adding completely hydrolyzed proteins the creaming and the separation is avoided and a substantial increase of viscosity is obtained.

Hence the object of this invention consists in the production of aqueous dispersions of rubber, gutta percha, balata or the like containing or not additional substances, the viscosity of which is greater than the viscosity which could be reached with concentration before the point of inversion, without being of pasty consistency, in order to render these dispersions more suitable for dipping, spreading, painting, spraying and the like purposes.

Additional substances, as sulphur or other vulcanizing substances, filling materials of any description, softeners, dyes, accelerators, anti-oxidizers and all kind of substances used in preparing mixes of rubber, balata or gutta percha may be added to the dispersion. The invention can be used also with rubber and the like dispersions which are vulcanized or have been subjected to any other preliminary treatment.

The invention consists in adding to aqueous dispersions of rubber, gutta percha and balata containing or not additional substances, such quantities of proteins such as gelatine, which in high concentrations yield gels, but, are according to this invention, subjected to a total hydrolysis.

The hydrolized gelatine, need, however, not be added in so great quantities as to injure the quality of the rubber, but in some cases the quality of rubber is even improved by such addition. The quantities added vary according to the substance added and the desired viscosity, between 0.5 and 5%.

The hydrolysis of the gel-forming substances can be effected in a manner known per se by the action of acids or alkalis, by heating, fermentation or the like, before adding to the rubber or even after having been added to the dispersion.

Natural rubber latex is usually preserved with slight quantities of ammonia or amines. These preserving substances can be used as hydrolyzers, so that if such preserved latex to which the gel-forming substance has been added, is heated, a sufficient hydrolysis of the gelatine can be produced in order to prevent gel formations even if gelatine is added in quantities sufficient to increase the viscosity to the desired degree.

*Example*

To an aqueous rubber dispersion containing about 35% rubber and 1% free ammonia so much of a hot aqueous solution of gelatine is added that the mixture contains 1-2% gelatine and at least 0.5% ammonia. After cooling for several hours the mixture forms a solid gel. When the mixture is heated thereupon for about 6 hours to 80° C. it will form a liquid of the viscosity of an oil varnish which will not gel on cooling.

Having now particularly described and ascertained the nature of my said invention and in what manner the same is to be performed, I declare that what I claim is:—

1. A method for the production of highly viscous aqueous dispersions of rubber, gutta percha or balata, which comprises adding an aqueous solution of a completely hydrolized gel-forming protein substance in such quantities as to increase the viscosity of the said dispersion above the viscosity which would be obtained by concentration alone before the point of inversion of the dispersion is reached.

2. A method according to claim 1 in which the increase of viscosity is obtained by the addition of gelatine which has been completely hydrolyzed.

In testimony whereof I affix my signature.
MAX FORRER.